United States Patent [19]
Tritton

[11] Patent Number: 4,902,059
[45] Date of Patent: Feb. 20, 1990

[54] VEHICLE BUMPER SYSTEM FOR FORMING PART OF ENGINE COOLING ASSEMBLY

[76] Inventor: Richard F. Tritton, 46880 Crawford St., Fremont, Calif. 94539

[21] Appl. No.: 246,553

[22] Filed: Sep. 19, 1988

[51] Int. Cl.⁴ .......................................... B60R 19/48
[52] U.S. Cl. ................................. 293/117; 180/68.4; 123/41.48; 165/41; 165/44; 165/168
[58] Field of Search ..................... 293/117; 180/68.4; 123/41.48; 165/41, 44, 168

[56] References Cited

U.S. PATENT DOCUMENTS

| | | | |
|---|---|---|---|
| 1,486,222 | 3/1924 | Berry | 293/117 X |
| 2,187,976 | 1/1940 | La Delfa | 293/117 X |
| 2,260,578 | 10/1941 | Murray | 293/117 X |
| 2,789,647 | 4/1957 | Couse | 180/68.4 X |
| 3,284,122 | 12/1964 | Rich | 293/107 |
| 4,567,955 | 2/1986 | Baravalle | 293/117 X |
| 4,653,788 | 3/1987 | Di Giusto | 293/117 |

OTHER PUBLICATIONS

Catalog of RoughRider by Whitco, Fall/Winter 1988, pp. 1 & 2.

Catalog of J. C. Whitney & Co., Chicago, Ill. Copyright 1982 (otherwise undated), title page and p. 60.

*Primary Examiner*—Margaret A. Focarino
*Assistant Examiner*—Andrew C. Pike
*Attorney, Agent, or Firm*—Townsend and Townsend

[57] ABSTRACT

An improved vehicle bumper system which mounts in a conventional manner on the front of a vehicle and which is tubular so that engine coolant can flow into, through and out of the bumper system and thereby be placed in heat exchange relationship to the ambient air. The bumper system further includes one or more valves coupled to the engine block to selectively place the bumper system in or out of fluid communication with the engine block. The bumper system itself can be a single bumper member or two or more bumper members, if desired. For a pair of bumper members, such members are typically vertically spaced apart and in vertical alignment with each other while the ends of the bumper members are in fluid communication with each other. The inlet and outlet of the bumper system is conveniently located so that hoses or tubes can easily couple the bumper system to the engine block of the vehicle.

19 Claims, 1 Drawing Sheet

VEHICLE BUMPER SYSTEM FOR FORMING PART OF ENGINE COOLING ASSEMBLY

This invention relates to improvements in vehicle bumper structures and, more particularly, to a bumper system for a vehicle in which the bumper system may form part of the engine cooling system of the vehicle.

BACKGROUND OF THE INVENTION

It is well known that vehicles, such as passenger automobiles, trucks and the like, overheat as they pull trailers uphill or over rough terrain. This overheating effect is caused by the engine's need to be cooled to a greater degree than during the time when the vehicle is moving along a horizontal path or downhill.

Attempts to solve this problem have been made by providing increased radiator capacity, such as by installing oversized radiators on vehicles. This is an expensive resolution of the problem and one which gives rise to other problems as well. Because of these limitations of conventional engine cooling systems, a need exists for improvements in such systems to provide for increased cooling capacity for the engine block of a vehicle. The present invention satisfies this need.

SUMMARY OF THE INVENTION

The present invention provides an improved vehicle bumper system which mounts in a conventional manner on the front of a vehicle and which is hollow or tubular so that engine coolant can flow into, through and out of the bumper system and thereby be placed in heat exchange relationship to the ambient air surrounding the bumper system. The bumper system further includes one or more valves for total isolation and draining, each valve being coupled to the engine block to selectively place the bumper system in or out of fluid communication with the engine block. Thus, when the bumper system is needed to provide increased cooling capacity, the valve means can be actuated to couple the bumper system with the engine block. When it is desired not to use the added coolant capacity, one valve can be deactuated to shut off the fluid communication between the bumper system and the engine block. A second valve can be used with the first valve for isolation and draining.

The bumper assembly itself can have a single tubular member or two or more tubular members, if desired. For a pair of bumper members, such members are typically in vertical alignment with each other while the ends of the bumper members are in fluid communication with each other. The inlet and outlet of the bumper system is conveniently located so that hoses or tubes can easily couple the bumper system with the engine block of the vehicle.

The primary object of the present invention is to provide an improved bumper system for a vehicle wherein the system provides for added cooling capacity for the engine of the vehicle while the bumper system serves the added function as a bumper.

Another object of the present invention is to provide a bumper system of the type described wherein the bumper system can be selectively connected or disconnected in fluid communication with the engine block so that the bumper system need not be used as a part of the coolant system yet it still remains on the vehicle and serves as a bumper.

Other objects of this invention will become apparent as the following specification progresses, reference being had to the accompanying drawings for an illustration of the invention.

IN THE DRAWINGS

DESCRIPTION OF THE PREFERRED EMBODIMENT

Figure 3:
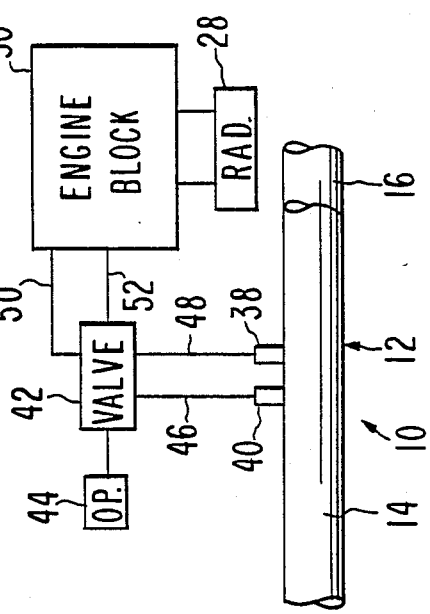
FIG. 3 is a top plan view, partly schematic and partly fragmentary, showing the bumper system coupled with the engine block and radiator of the vehicle for receiving engine cooling fluid therefrom.
Figure 1:
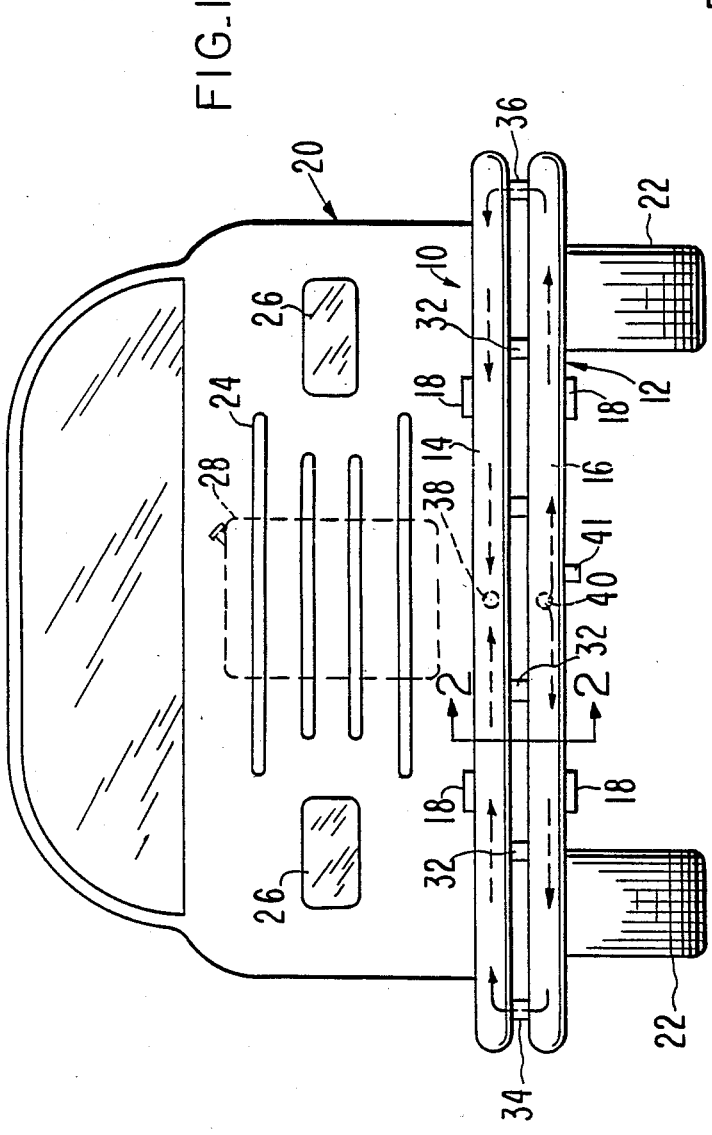
FIG. 1 is a front elevational view of a vehicle having the improved bumper system of the present invention mounted thereon.
Figure 2:
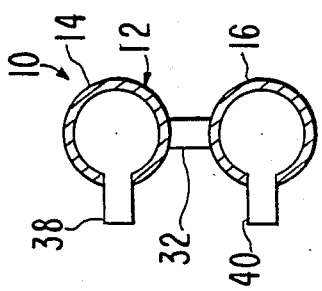
FIG. 2 is an enlarged, cross sectional view taken along line 2—2 of FIG. 1.

The improved bumper system of the present invention is broadly denoted by the numeral 10 and includes a bumper 12 formed of a pair of tubular, transversely circular bumper members 14 and 16 secured by conventional support means 18 (FIG. 1) in any suitable manner on the front end of a vehicle 20 having a pair of ground engaging wheels 22, a front grill 24 adjacent to and between headlights 26 and forwardly of a radiator 28 coupled to vehicle engine block 30 having a water pump (not shown). Thus, the bumper members are adjacent to one end of the vehicle, namely the front end of the vehicle, and the bumper members extend transversely of the path of travel of the vehicle, as shown in FIG. 1. Bumper members 14 and 16 are interconnected by spacers 32 to space the members apart so that they are parallel with each other. The end spacers 34 and 36 are tubular and place the ends of the upper member 14 in fluid communication with the ends of the lower member 16, members 14 and 16 being tubular throughout their entire lengths as shown in FIG. 2.

Bumper members 14 and 16 may be of any suitable construction so long as they provide heat exchange relationship to the atmosphere surrounding the bumper members. For purposes of illustration, bumper members 14 and 16 are made of steel and have good strength characteristics so that, in addition to being used to receive coolant from engine block 30, they also serve in the conventional manner as bumpers in the event that vehicle 20 is used to push another vehicle forwardly when bumper members 14 and 16 are in engagement with the adjacent bumper of the forward vehicle.

While a pair of bumper members 14 and 16 have been shown, a single bumper member can be used in place of a pair of bumper members. Moreover, there can be three or more bumper members coupled together in vertically spaced relationship, if desired. Moreover, the diameter of the bumper member can be selected from a range of values, such as from 3" to 9" in diameter or more. Also, the cross section of each bumper member, shown in FIG. 2 as being circular, can be different from that shown in FIG. 2. Spacers 32 can be secured in any suitable manner to bumper members 14 and 16, such as by welding or the like.

Upper bumper member 14 has a tubular extension 38 defining a fluid outlet for bumper system 12. Likewise, lower member 16 has a lateral extension 40 which is tubular and extends away from member 16 in the manner shown in FIG. 2. Extension 40 provides a fluid inlet for system 12. A drain 41 can be provided in lower member 16 to drain the coolant from the bumper.

Outlet extension 38 and inlet extension 40 are coupled through a valve means 42, such as one or a pair of valves, to engine block 30 which, in turn, is connected to radiator 28. If desired, valve means 42 can be eliminated and inlet and outlet extensions 40 and 38, respectively, can be connected directly to engine block 30. Valve means 42, on the other hand, provides for flexibility in the use of bumper system 10 in that the bumper system can be selectively put into the cooling system or taken out of the cooling system as desired. For purposes of illustration, it is assumed that the valve means 42 is in the system and the valve means can be taken out by actuation of a valve operator 44 and connected to valve means 42. The valve operator can be a rotatable handle, or vacuum actuated valve, or an electrically actuated motor for remotely actuating valve means 42.

Inlet extension 40 is coupled by a line 46 to valve means 42 and outlet extension 38 is coupled to line 48 which couples the valve means 42 to the outlet. Valve means 42 is coupled by lines 50 and 52 to engine block 30.

In operation, with valve means 42 in an off position, engine coolant flows out of engine block 30, through line 50, past valve means 42, through line 52, back through the engine block and to radiator 28 and back to the engine block. Thus, the coolant circulates through the engine block and is exposed in heat exchange relationship to the atmospheric air by radiator 28 so that the coolant is kept at a relatively low temperature for purposes of operating the engine associated with engine block 30.

When it is desired to add additional cooling capacity to the vehicle, such as when a trailer is to be towed, valve means 42 is actuated by valve operator 44, whereupon valve means 42 places line 50 in fluid communication with line 46. Thus, engine coolant will flow out of engine block 30, through line 50, through valve 42, through line 46, into inlet extension 40, through lower bumper member 16 in both directions as shown by the arrows, then upwardly through end tubular spacers 34 and 36 through the upper bumper 14 then into outlet extension 38, through line 48, valve means 42, through line 52, into the engine block, then to the radiator 28 and then the radiator into the engine block 30. The coolant continues to circulate in bumper apparatus 10 as well as engine block 30 so long as the valve means 42 is opened. The added cooling capacity afforded by bumper apparatus 10 allows the vehicle to pull greater loads up steep inclines and to keep the engine block sufficiently cool under such adverse conditions. The bumper system acts as a heat exchanger by placing the coolant therein in heat exchange relationship to the ambient air.

I claim:

1. A bumper system for a vehicle having an engine block with coolant receiving means comprising:
   a tubular bumper member having means thereon for coupling the same to the vehicle with the bumper being adjacent to one end of the vehicle and extending transversely of the path of travel of the vehicle;
   said bumper member having a fluid inlet and a fluid outlet spaced from each other; and
   means coupled to the inlet and outlet for placing the bumper member in fluid communication with the engine block of the vehicle for receiving coolant therefrom, whereby the coolant can flow through the bumper member and be placed thereby in heat exchange relationship with the ambient air.

2. A system as set forth in claim 1, wherein said bumper member is circular in cross section.

3. A system as set forth in claim 1, wherein said bumper member is formed of steel.

4. A system as set forth in claim 1, wherein said placing means includes a pair of fluid lines coupled to the inlet and outlet, respectively, of the bumper member.

5. A system as set forth in claim 1, wherein said placing means includes valve means coupled with said bumper member for selectively placing the bumper member in fluid communication with the engine block.

6. A system as set forth in claim 1, wherein is included a second bumper member below the first bumper member, said bumper members being spaced apart, one of the bumper members having said outlet and the other bumper having said inlet, the bumper members being in fluid communication with each other at a location spaced from said inlet and said outlet.

7. A system as set forth in claim 6, wherein said inlet and outlet are vertically spaced apart.

8. A system as set forth in claim 6, wherein said inlet is vertically aligned with an outlet.

9. A system as set forth in claim 6, wherein is included tubular end spacers placing the upper bumper member in fluid communication with the lower bumper member.

10. A bumper assembly for a vehicle having an engine block with coolant-receiving means comprising:
    a pair of vertically spaced tubular bumper members having means thereon for coupling the bumper members to the vehicle with the bumper members being adjacent to one end of the vehicle and extending transversely of the path of travel of the vehicle, one of said bumpers having a fluid inlet and the other bumper member having a fluid outlet, the bumper members being in fluid communication with each other at a location spaced from said inlet and said outlet; and
    means coupled to the inlet and outlet for selectively placing the bumper members in fluid communication with the engine block for receiving coolant therefrom, whereby the coolant can flow through the bumper members and be placed thereby in heat exchange relationship with the ambient air.

11. A system as set forth in claim 10, wherein each bumper member is circular in cross section.

12. A system as set forth in claim 10, wherein each bumper member is formed of steel.

13. A system a set forth in claim 10, wherein said placing means includes an actuatable valve selectively coupling the bumper members to the engine block.

14. A system as set forth in claim 10, wherein is included tubular end spaces placing the bumper means in fluid communication with each other.

15. In combination:
    a vehicle having an engine block with coolant-receiving means thereon;
    a pair of vertically spaced tubular bumper members having means thereon for coupling the same to the vehicle with the bumper members being adjacent to one end of the vehicle and extending transversely of the path of travel of the vehicle, one of said bumpers having a fluid inlet and the other bumper member having a fluid outlet, the bumper members being in fluid communication with each other at a location spaced from said inlet and said outlet; and
    means coupled to the inlet and outlet for selectively placing the bumper members in fluid communication with the engine block for receiving coolant therefrom, whereby the coolant can flow through the bumper members and be placed thereby in heat exchange relationship with the ambient air.

16. A system as set forth in claim 15, wherein each bumper member is circular in cross section.

17. A system as set forth in claim 15, wherein each bumper member is formed of steel.

18. A system as set forth in claim 15, wherein said placing means include an actuatable valve selectively coupling the bumper members to the engine block.

19. A system as set forth in claim 15, wherein is included tubular end spacers placing the bumper members in fluid communication with each other.

* * * * *